United States Patent [19]
Bertram

[11] 3,902,998
[45] Sept. 2, 1975

[54] METHOD OF REMOVING OIL FROM WATER USING RICE HULLS

[75] Inventor: Lyle E. Bertram, Carmi, Ill.

[73] Assignee: The Standard Oil Company, Cleveland, Ohio

[22] Filed: Aug. 9, 1971

[21] Appl. No.: 170,330

[52] U.S. Cl. .......................... 210/40; 210/DIG. 21
[51] Int. Cl.² ........................................ B01D 15/00
[58] Field of Search ... 210/23, 39, 40, 502, DIG. 21

[56] References Cited
UNITED STATES PATENTS
2,367,384  1/1945  Tymstra ...................... 210/DIG. 21

OTHER PUBLICATIONS

Arthur D. Little, Inc., "Combating Pollution Created by Oil Spills," Vol. 1, June 1969, p. 61.

*Primary Examiner*—Charles N. Hart
*Attorney, Agent, or Firm*—John F. Jones; Sherman J. Kemmer

[57] ABSTRACT

Rice hulls are floated on water contaminated with oil to absorb the oil which is then removed by skimming the combined oil-rice hull material from the water.

4 Claims, No Drawings

METHOD OF REMOVING OIL FROM WATER USING RICE HULLS

This invention relates to the removal of oil from water and more particularly pertains to the removal of oil or oily materials from oil-contaminated water by means of rice hulls, an inexpensive and readily available material.

It is well known that both fresh water and sea water sources become contaminated or polluted with oil because of accidental oil spills which may be caused by many factors such as tanker mishaps, pipeline breaks, and other accidental spills of many types. It is also well known that there is a growing need for effective methods for treating oil-polluted waters to remove oils and oily materials therefrom. Numerous prior methods have been suggested for the removal of oil from water including mechanical skimming devices as well as oil adsorbants and absorbants.

Various materials have been suggested for the purification of water by the removal of oil or oily matter therefrom as in connection with condensing steam plants wherein oil is removed from condensed steam so that the water may be used again in the boiler without any of the harmful effects which are experienced when oily feed water is used in steam boilers. Oil separators which act upon exhaust steam from steam engines, pumps and the like have been used. The production of flocculent precipitates which in settling may gather up and carry down with them the oil in the water has been tried. Other operations for removing oil from water are known to the art. Particularly materials such as magnesite, dolomite, serpentine, olivine, asbestos, vermiculite, straw, hay, ground corn cobs, sawdust, and other materials such as those described in "Journal of the Institute of Petroleum", January 1971, page 38, have been used as absorbants for removal of oil from water.

I have discovered that rice hulls per se, which have received no further treatment such as chemical coating on the surface thereof, upon contact with oil-polluted water very effectively will remove the oil therefrom. Thus, simply spreading rice hulls upon the surface of an oil-contaminated settling pond and then removing the rice hull-oil mixture will quickly remove oils therefrom. For example, the effluent from process or from settling ponds can be passed through a sluice wherein is retained a layer of rice hulls which floats on the water. The rice hulls absorb the oil and the water passes on substantially free from oil. Also, effluents can be passed through fixed beds of rice hulls to remove oil therefrom. Bodies of water that are contaminated, such as ponds and the like, can be treated by simply spreading rice hulls on the surface whereupon the rice hulls, which have become loaded with oily matter or residues through adsorption, absorption, or possibly both can be skimmed from the water surface or can be removed by centrifugal or rotary pumps which provide suction lift. Even when following a procedure which involves agitation of a slurry of rice hulls and oil-contaminated water the rice hulls can be used since the rice hulls when so used will float upon the surface of the water when it is allowed to become quiescent.

Further, the oil-loaded rice hulls can be treated in various ways for recovery of the oil therefrom. Still further, the oil and the rice hulls as recovered can be burned as a fuel which leaves only a small residue.

It is an object of this invention to provide a method for the removal of oil or oily contaminants from water. It is another object of this invention to provide a solid fuel by-product of the removal of oily or oily contaminants from water.

Other aspects, concepts and objects of this invention are apparent from a study of this disclosure and claims.

According to this invention, oil is removed from water contaminated therewith by contacting the oil-contaminated water with rice hulls. Further, according to this invention, the rice hulls need be merely floated upon the oil-contaminated water and the rice hull layer separated from the water to effectively separate the oil from the water. This is so whether the water is drawn off from beneath the rice hull layer or whether the rice hull layer is skimmed from the water surface.

Rice hulls useful in the process of this invention are derived from rice processing without any further treatment such as chemical coating on the surface thereof and are well known to those skilled in the art. More details concerning the nature and sources of rice hulls are presented in the book, *The Chemistry of Cereals as Food and Feed* by S.A. Matz, AVI Publishing Co., Westport, Conn. (1959), particularly in Chapter 16, "Rice Processing" by E.B. Kester.

Rice is a covered cereal; in the threshed grain (or rough rice), the kernel is enclosed in a tough siliceous hull (or husk) which renders it unsuitable for human consumption. When the hull is removed, the kernel is known as brown rice or unpolished rice. The rice hull is usually removed by a milling or shelling operation which can be done in any of a variety of machines designed for this purpose. After the hulls are removed they are usually separated from the heavier rice kernels by aspiration. In 1959 there were approximately 400,000 tons of rice hulls produced in the United States and in recent years the hulls have been produced at the rate of 1 million tons per year, and most of these were burned as a disposal means (see "Business Week", July 3, 1971, page 18).

Rice hulls have been used on occasion for stock litter, the soft grit blasting of metals, soil conditioning, polishing of semi-precious gems, making activated chars and carbon black, and as a fuel (boiler fuel in rice mills). Rice hulls have also been used as a seed diluent in the planting of seeds. Although rice hulls are low in food calories, limited amounts of them can be used in animal feeds without injury to animals.

Until the present invention was made, there had been no potentially large-scale use of rice hulls.

The method of this invention can be carried out at any temperature at which water exists. Ordinarily, the operation is effected at or below atmospheric pressure. However, elevated pressures can be employed. The time of contact of the rice hulls with the oil-contaminated water will depend somewhat upon the degree of purification desired to be obtained.

The optimum amount of rice hulls to be employed per amount of oil for each type of oil for each embodiment of this process, taking into account the volume of water, can readily be determined by mere mixture tests by one skilled in the art. I generally prefer to use a substantial excess of rice hulls over the minimum actually needed to absorb the oil because the process is thus speeded up and because the rice hulls are realtively cheap.

The process of my invention is further illustrated in the following examples.

EXAMPLE 1

About 25 gallons of city water were added to a 55-gallon metal motor oil drum which was open at the top and an ⅛ inch layer of crude oil was added to cover the surface of the water. Rice hulls were then thrown into the drum to make about a ¼ inch coverage on the oil surface and were left undisturbed for about 15 minutes. The oil-saturated hulls were then completely removed with an ⅛ inch mesh strainer leaving behind in the drum water which did not have a sheen or rainbow of crude oil on its surface.

Tests similar to the above were carried out in which the oil-soaked rice hulls were left in the drum for 1½ hours and during this time none of the oil-rice hull combination sank into the bottom of the drum. In another test, the rice hulls were added to the surface of water alone in the drum and it was found that after 2 hours of soaking in water only about 5% by weight of the rice hulls had sunk to the bottom of the drum.

EXAMPLE 2

An actual field test was run on an oil-contaminated salt water pit. The salt water pit initially had some weathered crude oil on its surface, but in order to get complete pit coverage, 3 barrels of fresh 35 gravity crude oil were also added to the pit which was generally of rectangular shape of approximately 20 feet × 35 feet. The oil-covered salt water pit was then treated with enough rice hulls to cause a ¼ inch coating on the top thereof. In about 20 minutes after adding the rice hulls a 20-foot minnow seine was used to skim the oil-soaked rice hulls to the edge of the salt water pit. A tank truck equipped with a 2 inch rotary pump was used to remove the oil-saturated rice hulls from the water surface from the area where they had been concentrated. After the oil-saturated rice hulls had been removed there was no evidence that crude oil had been on the surface of the salt water pit.

EXAMPLE 3

A test similar to that described in Example 1 was carried out to determine whether rice hulls could be used to clean up gasoline spilled on water as they had been used to clean up petroleum oil. The procedure of Example 1 was repeated using motor gasoline. The gasoline-soaked rice hulls were removed from the water and were burned in a safe place leaving only a small residue. A lighted torch was then thrown into the drum containing the decontaminated water and was extinguished by the water with no flash burning indicating the absence of gasoline and gasoline vapor in the top of the drum.

I claim:

1. A method for removing oil or oily substances contaminating water which comprises contacting said water with rice hulls derived from rice processing without any further treatment such as chemical coating on the surface thereof and then separating the rice hulls containing said oil or oily substances from said water to recover water substantially free from said oil or oily substances.

2. The method according to claim 1 in which the rice hulls containing said oil or oily substances are removed by skimming from said water.

3. A method according to claim 1 which comprises removing the water from below a layer of said rice hulls containing said oil or oily substances.

4. A method according to claim 1 wherein the water and oil or oily substances contaminating same are pased through a bed of rice hulls.

* * * * *